UNITED STATES PATENT OFFICE.

WILLIAM H. ORR, OF LIMA, OHIO.

WALL-PLASTER.

SPECIFICATION forming part of Letters Patent No. 723,015, dated March 17, 1903.

Application filed October 13, 1902. Serial No. 127,179. (No specimens.)

*To all whom it may concern:*

Be it known that I, WILLIAM H. ORR, a citizen of the United States, residing at Lima, in the county of Allen and State of Ohio, have invented new and useful Improvements in Wall-Plaster, of which the following is a specification.

This invention relates to a composition of matter primarily intended as a wall-plaster; and the object of the invention is to provide an inexpensive article of this character which can be easily applied to brick walls, metal or wooden lathwork, and which can be freely worked by trowels and other tools without rusting the same. The composition is light, flexible, and highly adhesive; and it consists of water-granulated furnace-slag, calcined gypsum or stucco, fire-clay, (refined,) natural cement, Portland cement, wood fiber, (dry,) and stucco-retarder, and I will hereinafter set forth the proportions of the ingredients usually and preferably employed, a ton or two thousand pounds avoirdupois being adopted as a standard.

I employ herein the term "water-granulated" as applied to the furnace-slag in order to distinguish such ingredient from hard slag crushed and ground in the ordinary manner—that is, crushed and dry ground. I take the slag just as it comes from a furnace—that is, in its hot and molten condition—and by artificial means bring it in contact with water, which serves to blast it thoroughly, after which it is to be dried in the manner of drying sand or in any other suitable way, when it is ready for use. I have found by experiments that the water blasted or granulated slag is sharp and about forty per cent. lighter than the same bulk of sand or crushed or dry-ground slag. By water granulation the lime properties in the slag are thoroughly slaked, and the same is put into a desirable condition after it has been dried for admixture with different kinds of plastic materials, such as calcine, cement, clay, &c. The water serves to thoroughly blast the slag in order to obtain fine granulation of the same.

After the slag has been reduced to the proper granulated condition it is thoroughly dried, either artificially or otherwise, so as to assure its intimate association with the other ingredients of the mixture.

Adopting a ton as the standard, the proportions of the ingredients are as follows, or substantially so, as slight variations to meet different conditions may be adopted: water-granulated furnace-slag, five hundred and forty pounds; fire-clay, (refined,) three hundred pounds; natural cement, four hundred and eighty pounds; Portland cement, one hundred pounds; calcined gypsum or stucco, five hundred and twenty pounds; wood fiber, (dry,) sixty pounds, and stucco-retarder, from three to six pounds, the latter being employed to retard the set of the plaster, and the atmospheric conditions will determine the amount of stucco-retarder to be used. By retarding the set of the composition it will not crack after being put upon a wall or other backing.

The ingredients, all dry, are thoroughly mixed, so as to properly blend the same, and this operation can be accomplished either by hand or mechanically, and I may combine with the same a pigment or coloring-matter, so that when the plaster is placed upon a wall it will present an ornamental and painted effect without the necessity of subsequently painting the same.

As I employ no lime in the composition, the coloring-matter stands firm. Besides this, the latter adds strength and hardness to the plaster.

The composition is placed dry with or without the coloring-matter in bags or like receptacles, so that it can be readily transported, and when ready for use it is emptied into a box or like vessel and mixed thoroughly with enough water to secure a mass that is sufficiently plastic to be spread easily upon a wall.

My improved composition, therefore, includes in its make-up water granulated or blasted furnace-slag and a suitable plastic material or materials and stucco-retarder. Said composition can be inexpensively and readily prepared. It is light and can be easily worked and applied.

By the term "natural cement" employed herein I refer to that made from natural cement-rock crushed and ground by the regular process, while by the term "Portland cement" I mean cement made in a different manner, generally from marl and limestone burned and recarbonated and treated differently from the natural cement.

Having described the invention, what I claim is—

1. A composition of matter for wall-plaster consisting of water-granulated dry furnace-slag, natural cement, Portland cement, fire-clay, calcined gypsum, wood fiber, and stucco-retarder in substantially the proportions set forth.

2. A composition of matter for wall-plaster consisting of water-granulated blast-furnace slag, natural cement, Portland cement, fire-clay, calcined gypsum, wood fiber, stucco-retarder, and a pigment, in substantially the proportions hereinbefore set forth.

In testimony whereof I have hereunto set my hand in presence of two subscribing witnesses.

WILLIAM H. ORR.

Witnesses:
D. J. CABLE,
HENRY W. NEFF.